Figure 1:
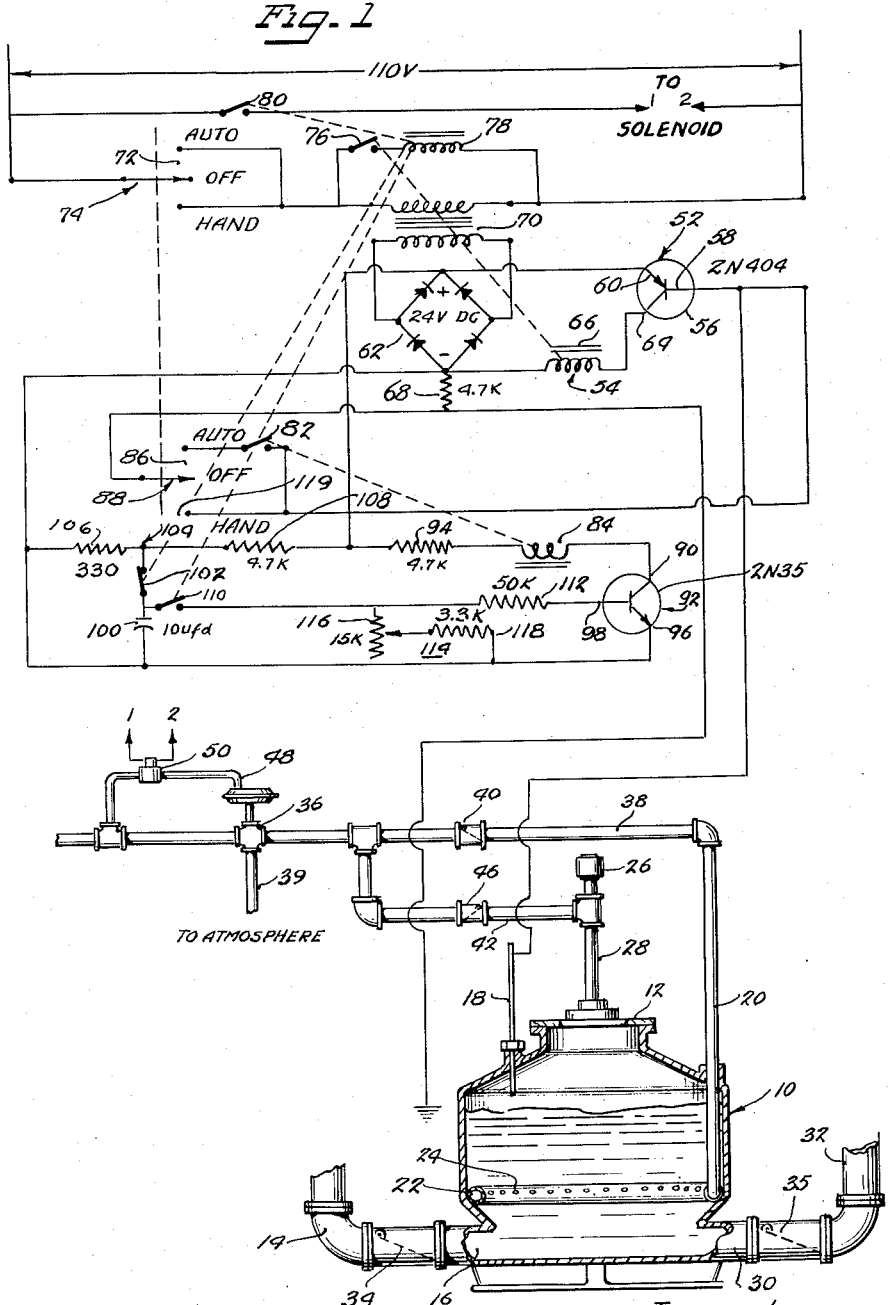

Jan. 21, 1964

E. J. CIABATTARI ETAL 3,118,391

PNEUMATIC SEWAGE EJECTOR

Filed Oct. 12, 1959

2 Sheets-Sheet 1

Inventors
EMIL J CIABATTARI
EUGENE A BISHOP Jr.

By Soans, Anderson, Luedeka & Fitch
Attys

Inventors
EMIL J. CIABATTARI
EUGENE A. BISHOP Jr.

United States Patent Office 3,118,391
Patented Jan. 21, 1964

3,118,391
PNEUMATIC SEWAGE EJECTOR
Emil J. Ciabattari, Chicago, and Eugene A. Bishop, Jr., Evanston, Ill., assignors to Yeomans Brothers Company, Melrose Park, Ill., a corporation of Delaware
Filed Oct. 12, 1959, Ser. No. 845,692
4 Claims. (Cl. 103—240)

The present invention relates generally to pneumatic sewage ejectors and in particular to an improved liquid level control in such a sewage ejector.

Generally, in previously available pneumatic sewage ejectors, a two-electrode liquid level control has been used. One of the electrodes, which is longer than the other, is extended into the receiver of the pneumatic ejector to the position of the desired low level of the sewage in the receiver, and the other electrode is extended into the receiver to the position of the desired high level of the sewage. In operation, when the sewage level in the receiver reaches the lower end of the shorter electrode, a circuit is completed from the receiver, which is grounded, through the sewage and to the shorter electrode. Upon the completion of the circuit, pressure air is delivered to the receiver, which air causes the sewage to be ejected from the receiver until the grounded sewage breaks contact with the lower end of the longer electrode.

While such a level control has provided an effective level control in a sewage ejector, certain difficulties have been experienced in its operation. For example, when a rag or other conductive debris in the sewage clings to the longer electrode, it prevents the sewage from breaking contact with the longer electrode. Consequently, pressure air is continually supplied to the receiver, thereby preventing sewage in the inlet pipe from collecting in the receiver. When the debris is an insulator, the sewage is prevented from making contact with the electrode and, accordingly, the ejector becomes inoperative.

Another difficulty that has occurred with the previously available liquid level control is that grease from the sewage collects in the receiver and bridges the gap between the longer electrode and the shorter electrode. When the grease is conductive, pressure air is delivered to the receiver as soon as the sewage level contacts the longer electrode. Since the introduction of pressure air is discontinued when the sewage level drops below the longer electrode, the bridging of the electrodes results in a rapid on-off operation and the sewage is thus prevented from collecting in the receiver. When the grease is non-conductive, the sewage is prevented from contacting the longer electrode and the ejector becomes inoperative.

An object of the present invention is the provision of an improved liquid level control in a sewage ejector. Another object of the invention is the provision of a relatively trouble-free, electrically operated liquid level control in a sewage ejector. A further object is the provision of a relatively inexpensive liquid level control of the type indicated which is readily adaptable to existing sewage ejectors.

Other objects and advantages of the present invention will become apparent by reference to the following description and accompanying drawings.

Figure 2:
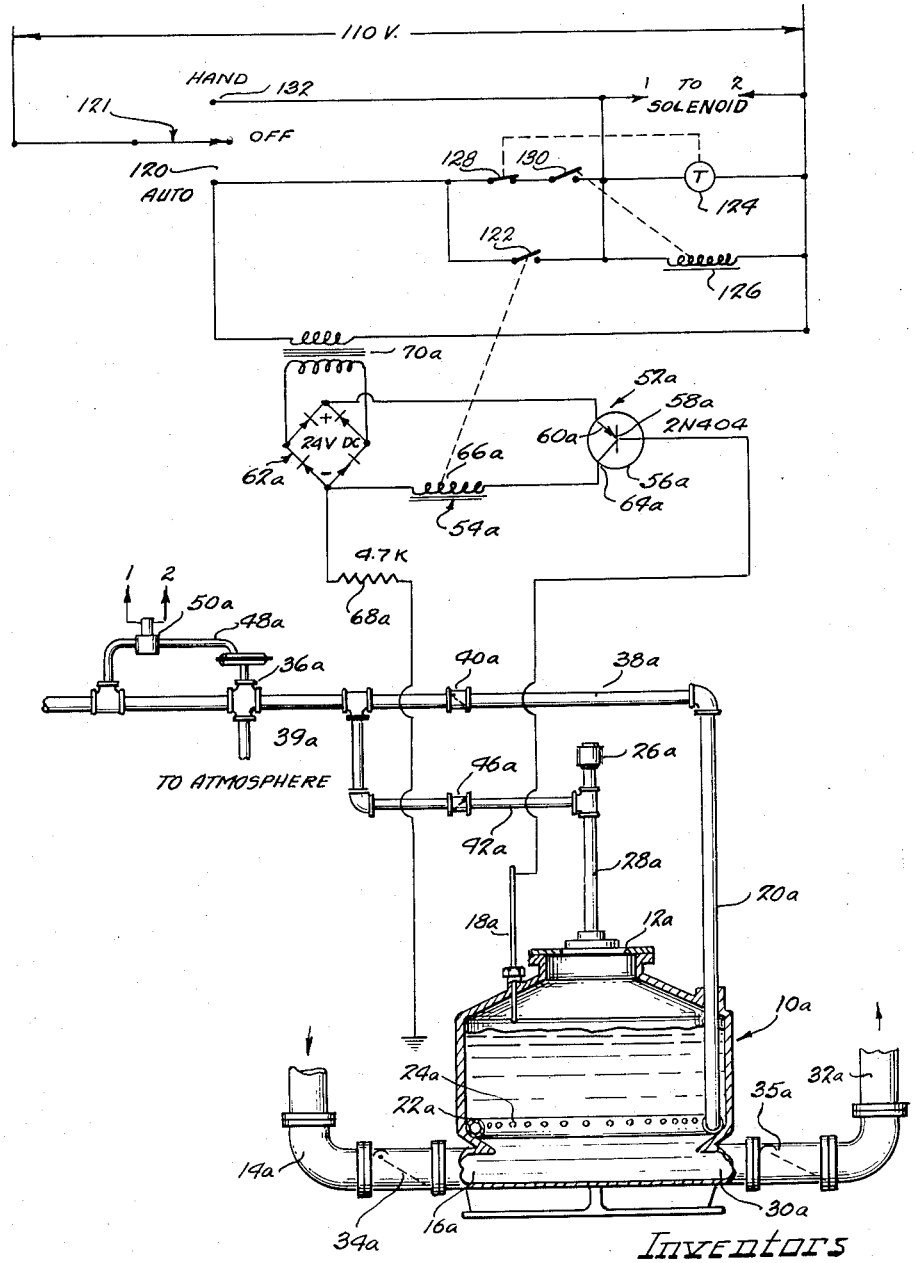

In the drawings:

FIGURE 1 is a schematic view of a sewage ejector showing various features of the present invention; and FIGURE 2 is a schematic view of another embodiment of the sewage ejector.

The sewage ejector, in accordance with the present invention, includes a receiver for sewage having a sewage inlet pipe and a sewage outlet pipe. A source of pressure air is connected through an air inlet pipe to the receiver, which air inlet pipe is provided with a valve means. Means are connected to the valve means so as to actuate the valve means for a preselected time interval when the sewage in the receiver reaches a predetermined level. The actuating means includes an electrode extending into the receiver to the predetermined level, and means for grounding the sewage in the receiver. The actuating means also includes a switch means connected to the grounding means and the electrode for actuating the valve means when the grounded sewage contacts the electrode. The switch means also operates a timing means which keeps the valve means open for introduction of pressure air into the ejector throughout the preselected time interval.

More particularly, the sewage ejector shown in FIGURE 1 is a combination pneumatic ejector and aerator and includes a receiver 10 having a generally cylindrical body portion and a dome-shaped upper portion. A removable central cover plate 12 is provided on the upper portion to provide access to the receiver.

Sewage is delivered through inlet piping 14 to a fluid inlet passageway 16 at the lower portion of the receiver 10. The sewage is collected in the receiver 10 until the sewage level makes contact with an electrode 18 extending vertically through the dome of the receiver 10. When the sewage level contacts the electrode 18, a liquid level control, which is described more fully hereinafter, is actuated, whereby pressure air is delivered to the receiver 10 for a predetermined time interval to eject the sewage from the receiver 10.

Pressure air is delivered through an air inlet pipe 20 extending vertically through the dome to an annular conduit 22 disposed in the lower portion of the receiver 10. The annular conduit 22 is provided with small openings 24 to allow pressure air to enter the receiver. Air is thus diffused at the lower portion of the sewage within the receiver 10, then bubbles up upwardly through the sewage and is collected within the dome of the receiver 10.

A portion of the pressure air which is collected in the dome of the receiver 10 is permitted to bleed off to the atmosphere through a restricted orifice fitting 26 at the upper end of an air exhaust pipe 28 which is attached to the cover plate 12 of the receiver 10. With this arrangement, the sewage in the receiver 10 is subjected to a greater quantity of air during the ejection cycle and the air is dispersed through the sewage in the form of very small bubbles. As the pressure of the air in the receiver 10 increases, it forces the highly aerated sewage within the receiver 10 out through a fluid outlet passageway 30 in the lower portion of the receiver 10 to outlet piping 32 which carries the sewage to subsequent treatment apparatus. Check valves 34 and 35 are disposed respectively in the inlet piping 14 and the outlet piping 32 to prevent back flow of the sewage.

As shown in FIGURE 1, pressure air is delivered to the air inlet pipe 20 through a piping arrangement which is adapted to deliver pressure air to the receiver 10 and to vent the receiver 10 after ejection of the sewage to permit the receiver 10 to again fill to the predetermined upper level. The piping arrangement includes a two-position, three-way diaphragm valve 36 which is connected by a delivery pipe 28 to the air inlet pipe 20. Valve 36 is normally disposed to place the exhaust pipe 28 in communication with the atmosphere through the pipe 39. When the diaphragm valve 36 is actuated, as will be described hereinafter, the exhaust pipe 39 is closed and pressure air is fed from a source of pressure air, such as a compressor (not shown) through the delivery pipe 38 to the air inlet pipe 20 and thence into the receiver 10. A check valve 40 is disposed in the delivery pipe 38 to prevent back flow of sewage through the annular conduit 22.

When the diaphragm valve 36 is in its de-energized position, air in the receiver 10 is permitted to vent to the atmosphere through the exhaust pipe 28, through a connecting pipe 42 connected between the delivery pipe 38 and the air exhaust pipe 28, and thence through the diaphragm valve 36 to the vent pipe 39. A one-way check valve 46 is disposed in the connecting pipe 42 to prevent pressure air from being introduced into the receiver 10 above the sewage during the ejecting cycle, the valve 46 being held closed by the pressure air in the delivery pipe 38.

As shown in FIGURE 1, the diaphragm valve 36 is actuated by pressure air supplied to the diaphragm of the valve 36 through a tubing 48 connected upstream of the valve 36. A solenoid valve 50 is connected into the tubing 48 to control the supply of pressure air and thus the actuation of the diaphragm valve 36.

As previously indicated, when the sewage level in the receiver 10 contacts the electrode 18, a liquid level control is actuated. The control is actuated by the sewage completing the circuit between the electrode 18 and the receiver 10 which is suitably grounded. Of course, the sewage may be grounded by extending a second electrode into the receiver, which electrode extends substantially to the bottom of the receiver. It should be realized that the second electrode in the arrangement is utilized to ground the sewage, which is quite different from the previously available liquid level controls where the second electrode controls the lower level of the sewage in the receiver.

As shown in FIGURE 1, the level control includes a transistor switching circuit 52 connected to the electrode 18 and the ground connection. A transistor switching circuit 52 is utilized so that a minor current through the sewage controls a control relay 54. Higher current in the sewage may cause electrolysis.

The transistor switching circuit 52 includes a p-n-p transistor 56, the base 58 of which is connected to the electrode 18. The emitter 60 of the transistor 56 is connected to the positive side of a direct current power source 62 which, as shown in the drawings, is a full-wave bridge rectifier circuit. The collector 64 of the transistor 56 is connected through the coil 66 of the control relay 54 to the negative side of the power source 62.

The base 58 of the transistor 56 is biased by a resistor 68 connected between the grounded receiver 10 and the negative side of the power source 62. The resistor 68 is made of a resistance small enough so that when a circuit is completed between the receiver 10 and the electrode 18, sufficient current passes through the collector 64 of the transistor 56 to energize the control relay 54. Of course, the resistor 68 is not made too small or else the transistor 56 may be damaged.

Alternating voltage is fed to the bridge rectifier circuit 62 by an isolating transformer 70, which is connected to a 110-volt line through an automatic contact 72 of a hand-off automatic switch 74.

When the relay 54 is energized, a normally open relay contact 76 associated therewith is closed. The contact 76 is connected in series with the automatic contact 72 and the coil of an auxiliary relay 78. A normally open contact 80 actuated by the auxiliary relay 78 is connected in series with the solenoid 50 that controls the diaphragm valve 36. Accordingly, when the contact 80 of the auxiliary relay 78 closes, pressure air is delivered to the receiver 10.

Since the circuit between the electrode 18 and the grounded receiver 10 is broken when the sewage level drops, a holding-timing circuit is provided to keep the solenoid 50 energized for a preselected time interval.

In the embodiment shown in FIGURE 1, the solenoid 50 is kept in an energized position by providing a circuit which connects the electrode 18 to ground for a preselected time interval after the sewage contacts the electrode 18. The electrode 18 is connected to ground through a normally open contact 82 of a timing relay 84, and an automatic contact 86 of a hand-off automatic switch 88, which is ganged with the previously mentioned hand-off automatic switch 74.

The coil of the timing relay 84 is connected in series with the collector 90 of an n-p-n transistor 92 connected as a switch. Positive voltage is provided for the collector 90 by connecting the positive terminal of the power source 62 through a load resistor 94 and the coil of the timing relay 84 to the collector 90. The emitter 96 of the transistor 92 is connected directly to the negative terminal of the power source 62.

The transistor 92 is switched from a conducting condition, wherein sufficient collector current flows to operate the timing relay 84, to a cut-off condition, wherein the collector current is insufficient to actuate the timing relay 84, by a resistance-capacitance timing circuit connected between the base 98 and emitter 96 of the transistor 92. The timing circuit includes a condenser 100 which is charged to a predetermined voltage by connecting the condenser through a normally closed contact 102 of the auxiliary relay 78 to a voltage divider 104. The voltage divider 104 includes a pair of series resistors 106 and 108 connected across the power source 62, the voltage to which the condenser 100 is charged depending upon the ratio of the resistors 106 and 108 and the voltage of the power source 62.

When the auxiliary relay 78 is energized, the condenser 100 is connected through a normally open contact 110 of the auxiliary relay 78 to the base 98 of the transistor 92. A biasing resistor 112 is inserted in series between the condenser 100 and the base 98 to prevent excess collector current from initially flowing through the transistor 92 and damaging the same.

The discharge current from the condenser 100 is partially shunted by an adjustable resistance 114 connected in parallel with the biasing resistance 112 and the base-emitter internal resistance of the transistor 92. The adjustable resistance 114, which includes a rheostat 116 and a low limit resistor 118, may be varied to change the discharge time of the condenser 100 and thus the length of time that the solenoid 50 is energized.

If the source of pressure air is a compressor, the starter coil of the compressor starter may be connected in parallel with the solenoid 50 so as to only operate the compressor when pressure air is required.

The hand contact 119 of the hand-off-automatic switch 88 is connected so as to by-pass the timing relay contact 82, and thus connect the electrode 18 to ground, in order that pressure air may be delivered to the receiver 10 as desired.

In operation, the sewage enters the receiver 10 and fills the receiver 10 until it reaches the lower end of the electrode 18. When the sewage reaches the lower end of the electrode 18, a circuit is completed between the grounded receiver 10 and the electrode 18, thus permitting a current to flow in the base circuit of the transistor 56. This current in the base circuit of the transistor 56 causes a much higher current to flow through the collector circuit of the transistor 56, which current is sufficient to energize the control relay 54 and close the control relay contact 76. When the control relay contact 76 closes, a circuit is completed to the auxiliary relay 78, thereby closing the auxiliary relay contact 80 and energizing the solenoid 50. The auxiliary relay 78 being energized causes the auxiliary relay contact 102 to open and auxiliary relay contact 110 to close, thereby connecting the charged condenser 100 into the base circuit of the transistor 92. Current flowing in the base circuit causes collector current to flow, thus actuating the timing relay 84 and closing the timing relay contact 82, thereby completing the circuit between the electrode 18 and ground.

When the solenoid 50 is energized, pressure air is delivered to the diaphragm valve 36 which then moves to close off vent 39 and place the source of pressure air in communication with pipe 38 for delivery of pressure air to the receiver 10, thereby ejecting the sewage therein. Pressure air is delivered until the condenser 100 is sufficiently discharged to de-energize the timing relay 84 and thus open the circuit between the electrode 18 and ground. The opening of the circuit allows the solenoid 50 to close and, if a compressor is used, allows the compressor to be deactivated.

FIGURE 2 shows a more expensive embodiment of the level control, wherein an electrical timer is utilized to control the time interval of delivery of pressure air. Substantially similar parts to those shown in FIGURE 1 are indicated by the same reference numerals, with the subscript "a."

As shown in FIGURE 2, the isolating transformer 70a is connected through an automatic contact 120 of a hand-off-automatic switch 121. When the relay 54a is energized by the sewage completing a circuit between the electrode 18a and ground, a normally open relay contact 122 associated therewith is closed. The contact 122 is connected in series with the automatic contact 120 and the solenoid 50a that controls the diaphragm valve 36a. Accordingly, when the contact 122 of the control relay 54a closes, pressure air is delivered to the receiver 10a.

Since the circuit between the electrode 18a and the grounded receiver 10a is broken when the sewage level drops, a holding-timing circuit is provided to keep the solenoid 50a energized for a preselected time interval. The holding-timing circuit includes a timer 124, the coil or motor of which is connected in parallel with the solenoid 50a and an auxiliary relay 126, the coil of which is connected in parallel with the solenoid 50a. Accordingly, when the solenoid 50a is energized, the timer 124 and auxiliary relay 126 are also energized.

The timer 124 is provided with a normally closed contact 128, and the auxiliary relay 126 is provided with a normally open contact 130, which contacts are connected in series, and the series contacts, in turn, are connected in parallel with the control relay contact 122. Accordingly, the auxiliary relay contact 130 and the timer contact 128 by-pass the control relay contact 122 and maintain the solenoid 50a in an energized position until the timer contact 128 opens a preselected time interval after the operation of the timer 124 is initiated.

If the source of pressure air is a compressor, the starter coil of the compressor starter may be connected in parallel with the solenoid 50a so as to only operate the compressor when pressure air is required.

The hand contact 132 of the hand-off automatic switch 121 is connected so as to by-pass the control relay contact 122, in order that pressure air may be delivered to the receiver 10a as desired.

In operation, the sewage enters the receiver 10a and fills the receiver 10a until it reaches the lower end of the electrode 18a. When the sewage reaches the lower end of the electrode 18a, a circuit is completed between the grounded receiver 10a and the electrode 18a, thus permitting a current to flow in the base circuit of the transistor 56a. This current in the base circuit of the transistor 56a causes a much higher current to flow through the collector circuit of the transistor 56a, which current is sufficient to energize the control relay 54a and close the control relay contact 122. When the control relay contact 122 closes, a circuit is completed to the auxiliary relay 126, the timer 124, and the solenoid 50a. When the solenoid 50a opens, pressure air is delivered to the diaphragm valve 36a which then moves to close off vent 39a and place the source of pressure air in communication with pipe 38a for delivery of pressure air to the receiver 10a, thereby ejecting the sewage therein. Pressure air is delivered until the timer contact 128 opens and de-energizes the solenoid 50a and shuts off the compressor, if a compressor is used.

It should be realized that the liquid level control may be used with different ejection arrangements than that described above. For example, the liquid level control may be used with the ejector shown and described in United States patent, No. 2,300,039. Moreover, the liquid level control may be utilized to control diaphragm valves which, in some applications, are substituted for the check valves in the inlet and outlet piping.

From the above it can be seen that since the electrode in the receiver remains substantially out of the sewage at all times, it cannot become fouled with debris or grease contained in sewage. Consequently, the liquid level control is less likely to become inoperative.

Various changes and modifications may be made in the above described ejector without deviating from the spirit or scope of the present invention. Various of the features of the invention are set forth in the accompanying claims.

We claim:

1. A pneumatic sewage ejector comprising a receiver for sewage, a sewage inlet pipe connected to said receiver, a sewage outlet pipe connected to the lower portion of said receiver, an air inlet pipe connected to said receiver, a source of pressure air connected to said air inlet pipe, valve means in said air inlet pipe, and control means for opening said valve means when the sewage in said receiver reaches a predetermined level to provide the flow of pressure air into said air inlet pipe, said control means including an electrode extending into said receiver to said predetermined level, means grounding said sewage within said receiver, a relay having a normally open contact, switch means connected to said grounding means and said electrode for actuating said relay when the grounded sewage contacts said electrode, a power source, an electrical actuating means for said valve means, said valve actuating means, power source and contact being connected in series whereby when said contact closes said valve means is opened to introduce pressure air into said air inlet pipe, an electrically operated timing means connected in parallel with said valve actuating means, said timing means having a normally closed contact, an auxiliary relay connected in parallel with said timing means, said auxiliary relay having a normally open contact, said auxiliary relay contact and said timer contact being connected in series, the series contacts being connected in parallel with said relay contact.

2. A pneumatic sewage ejector comprising a receiver for sewage, a sewage inlet pipe connected to said receiver, a sewage outlet pipe connected to the lower portion of said receiver, an air inlet pipe connected to said receiver, a source of pressure air connected to said air inlet pipe, valve means in said air inlet pipe, and control means for actuating said valve means for a preselected time interval when the sewage in said receiver reaches a predetermined level to provide the flow of pressure air into said air inlet pipe, said control means including an electrode extending into said receiver to said predetermined level, means grounding said sewage within said receiver, a relay having a normally open contact, switch means connected to said grounding means and said electrode for actuating said relay when the grounded sewage contacts said electrode, an auxiliary relay having a normally open contact, a power source, said power source, said auxiliary relay and said relay contact being connected in series, an electrical actuating means, said electrical actuating means, said power source and said auxiliary relay contact being connected in series whereby when said auxiliary relay contact closes said valve means is opened to introduce pressure air into said air inlet pipe, and means operated by said auxiliary relay contact for short circuiting said electrode to ground for said preselected time interval whereby said valve actuating means is energized for said preselected time interval.

3. A pneumatic sewage ejector comprising a receiver for sewage, a sewage inlet pipe connected to said receiver, a sewage outlet pipe connected to the lower portion of said receiver, an air inlet pipe connected to said receiver, a source of pressure air connected to said air inlet pipe, valve means in said air inlet pipe, and control means for actuating said valve means for a preselected time interval when the sewage in said receiver reaches a predetermined level to provide the flow of pressure air into said air inlet pipe, said actuating means including an electrode extending into said receiver to said predetermined level, means grounding said sewage within said receiver, a relay coil having a normally open contact, a transistor switch circuit connected to said relay and said grounding means and said electrode in such a way that a complete circuit between said grounding means and said electrode energizes said relay, said contact being connected so as to actuate the valve means when said contact closes, and a resistance-capacitance timing circuit operated by said contact for short circuiting said electrode to ground for the preselected time interval whereby said valve means is kept open for the introduction of pressure air into said air inlet pipe for said preselected time interval.

4. A pneumatic sewage ejector comprising a receiver for sewage, a sewage inlet pipe connected to said receiver, a sewage outlet pipe connected to the lower portion of said receiver, an air inlet pipe connected to said receiver, a source of pressure air connected to said air inlet pipe, valve means in said air inlet pipe, and control means for opening said valve means when the sewage in said receiver reaches a predetermined level to provide the flow of pressure air into said air inlet pipe, said control means including an electrode extending into said receiver to said predetermined level, means grounding said sewage within said receiver, a control relay having a normally open contact, switch means connected to said grounding means and said electrode for actuating said relay when the grounded sewage contacts said electrode, a power source, an auxiliary relay having two normally open contacts and a normally closed contact, said power source, said auxiliary relay and said control relay contact being connected in series, an electrical actuating means for said valve means, said valve actuating means, power source and one of said auxiliary relay normally open contacts being connected in series whereby when said auxiliary relay contact closes said valve means is opened to introduce pressure air into said air inlet pipe, a condenser, said condenser being connected through said auxiliary relay normally closed contact to a portion of said power source, a timing relay having a normally open contact which is connected between the electrode and ground, a transistor connected as a switch with the timing relay as a load, the other of said auxiliary relay normally open contact connecting said condenser so as to actuate said transistor switch when said auxiliary relay is energized.

References Cited in the file of this patent
UNITED STATES PATENTS

| | | |
|---|---|---|
| 1,826,477 | Olpp | Oct. 6, 1931 |
| 1,843,686 | Koch | Feb. 2, 1932 |
| 2,300,039 | Yeomans | Oct. 27, 1942 |
| 2,316,494 | Tipton | Apr. 13, 1943 |
| 2,326,442 | De Wit | Aug. 10, 1943 |
| 2,434,027 | Whittington | Jan. 6, 1948 |
| 2,456,456 | Smith | Dec. 14, 1948 |
| 2,550,093 | Smith | Apr. 24, 1951 |
| 2,634,682 | Dye | Apr. 14, 1953 |
| 2,669,941 | Stafford | Feb. 23, 1954 |
| 2,892,414 | Griffith | June 30, 1959 |
| 2,947,931 | Hubby | Aug. 2, 1960 |
| 3,019,764 | Schilling | Feb. 6, 1962 |

FOREIGN PATENTS

| | | |
|---|---|---|
| 599,357 | Germany | June 29, 1934 |